US008694836B2

(12) United States Patent
Lapiotis et al.

(10) Patent No.: US 8,694,836 B2
(45) Date of Patent: Apr. 8, 2014

(54) FAULT DIAGNOSIS EMPLOYING PROBABILISTIC MODELS AND STATISTICAL LEARNING

(75) Inventors: George Lapiotis, Astoria, NY (US); David Shallcross, Piscataway, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1013 days.

(21) Appl. No.: 12/694,651

(22) Filed: Jan. 27, 2010

(65) Prior Publication Data

US 2011/0185229 A1     Jul. 28, 2011

(51) Int. Cl.
*G06F 11/00*     (2006.01)

(52) U.S. Cl.
USPC .............. 714/47.3; 714/47.1; 714/25; 714/48

(58) Field of Classification Search
USPC ........................... 714/47.1, 47.2, 47.3, 25, 48
See application file for complete search history.

(56) References Cited

U.S. PATENT DOCUMENTS

| | | | |
|---|---|---|---|
| 5,309,448 A | 5/1994 | Bouloutas et al. | |
| 5,493,729 A | 2/1996 | Nigawara et al. | |
| 5,528,516 A | 6/1996 | Yemini et al. | |
| 6,076,083 A | 6/2000 | Baker | |
| 6,249,755 B1 | 6/2001 | Yemini et al. | |
| 2002/0111755 A1* | 8/2002 | Valadarsky et al. | 702/58 |
| 2004/0205420 A1* | 10/2004 | Seeley et al. | 714/57 |
| 2006/0168473 A1* | 7/2006 | Sahoo et al. | 714/15 |

OTHER PUBLICATIONS

M. Steinder, A. S. Sethi, "Probabalistic fault diagnosis in communication systems through incremental hypothesis updating", Computer Networks 45 (2004) pp. 537-562.

* cited by examiner

*Primary Examiner* — Sarai Butler
(74) *Attorney, Agent, or Firm* — Philip J. Feig

(57) ABSTRACT

A computer implemented fault diagnosis method employing both probabilistic models and statistical learning that diagnoses faults using probabilities and time windows learned during the actual operation of a system being monitored. In a preferred embodiment, the method maintains for each possible root cause fault an a-priori probability that the fault will appear in a time window of specified length as well as maintaining—for each possible resulting symptom(s)—probabilities that the symptom(s) will appear in a time window containing the fault and probabilities that the alarm will not appear in a time window containing the fault. Consequently, the method according to the present invention may advantageously determine—at any time—the probability that a fault has occurred, and report faults which are sufficiently likely to have occurred. These probabilities are updated based upon past time windows in which we have determined fault(s) and their cause(s). Advantageously, each root cause fault may be assigned its own time window length. By maintaining these probability parameters for several different window lengths, a window length that is particularly well-suited to a particular set of conditions may be chosen.

10 Claims, 11 Drawing Sheets

FAULT DIAGNOSIS EMPLOYING PROBABILISTIC MODELS AND STATISTICAL LEARNING

FIELD OF THE INVENTION

This invention relates generally to large complex systems and in particular to fault diagnosis employing probabilistic models and statistical learning.

BACKGROUND OF THE INVENTION

The ability to diagnose faults in large complex systems is both important and difficult. In a telecommunications network fault diagnosis is particularly difficult as it generally involves: receiving alarms from a variety of disparate equipment, determining the root cause(s) of the alarms, and finally initiating the repair of the faults.

Given their importance, methods and apparatus that facilitate fault diagnosis in large systems in general and telecommunications networks in particular would represent an advance in the art.

BRIEF SUMMARY OF THE INVENTION

An advance is made in the art according to an aspect of the present invention directed to a computer implemented fault diagnosis method employing both probabilistic models and statistical learning. The method diagnoses faults using probabilities and time windows learned during the actual operation of a system being monitored. In sharp contrast to the prior art, the method of the present invention uses a probabilistic model in which the probabilities are continuously improved based on observations of the system.

In a preferred embodiment, the method maintains—for each possible root cause fault—an a-priori probability that the fault will appear in a time window of specified length. Additionally, the method maintains—for each possible resulting symptom—probabilities that the symptom(s) will appear in a time window containing the fault and probabilities that the symptom(s) will not appear in a time window containing the fault. Consequently, the method according to the present invention may advantageously determine—at any time—the probability that a fault has occurred, and using observations of symptoms, report faults which are sufficiently likely to have occurred. These probabilities are updated based upon past time windows in which we have determined fault(s) and their cause(s) ("Ground Truth").

Advantageously, each root cause fault may be assigned its own time window length. By maintaining these probability parameters for several different window lengths, a window length that is particularly well-suited to a particular set of conditions may be chosen.

BRIEF DESCRIPTION OF THE DRAWINGS

A more complete understanding of the present disclosure may be realized by reference to the accompanying drawings in which.

DETAILED DESCRIPTION

Figure 1:
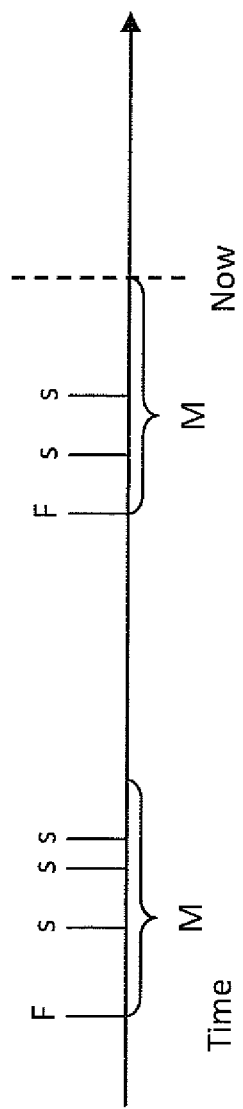
FIG. 1 is a simple drawing depicting faults and symptoms over a period of time.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background it is noted that a number of methods that have been proposed and/or used for fault diagnosis including rule-based methods; codebook-based methods; and probabilistic inference-based methods.

Generally, commercial fault diagnosis software employs rule-based inference methods. These rule-based methods codify the procedures and experience of previous manual systems. As may be appreciated by those skilled in the art, most anything that is computable may be performed—to a certain extent—by rule-based systems although the rules may become very complex. Unfortunately, if a diagnosis is extended to a new type of system or set of circumstances—such as a new network technology or new layers in the network—the experiences may not extend as dependencies and ambiguity in such technologies become increasingly complex.

In contrast to the rule-based system, a commercial fault diagnosis system, SMARTS, uses a codebook approach. As is known, a codebook is a table of possible faults and symptoms associated with those faults. When a fault occurs, the symptoms observed are compared with those contained in the codebook and the fault in the codebook most similar to the one observed is reported. As may be appreciated, not all of the symptoms associated with a particular fault are necessarily contained in the codebook. The codebook need only contain those symptoms sufficient to make a diagnosis. Notwithstanding this apparent simplicity, a codebook approach may be difficult to scale to very large or rapidly changing systems such as those found in a telecommunications environment.

A fault diagnosis system employing probabilistic inference builds a probabilistic model of the system under diagnosis and when symptoms arrive, selects the most likely faults that produce the symptoms. A general and particularly useful model for a probabilistic inference system is a Bayesian Network, which can model a system as a collection of random variables with specified, structured, dependencies.

Object-oriented Bayesian networks are known to be well-suited for formally specifying the propagating, partially random, effects of randomly occurring faults. Unfortunately, probabilistic inference may require an excessive amount of computation for large systems such as those encountered in—for example—telecommunications networks. Consequently, a certain degree of restriction must be imposed upon the Bayesian model to permit tractable computation.

By way of simple example and according to an aspect of the present disclosure, we note that when examining a log file of alarms occurring in a large complex system it is useful to note those alarms that are clustered in time. Accordingly, it is believed that these clustered alarms have a common cause. That is to say—and with initial reference to FIG. 1, it is assumed that for any fault F there is some maximum plausible delay time M for symptoms (s) to manifest, after which time it is unlikely that any further symptoms of that fault F will appear. Thus, if we consider only those symptoms appearing in the time interval of length M ending with the present (Now), then for any fault F we may consider all the symptoms for F that will ever arrive after a delay of M after F. Moreover, by restricting consideration only to symptoms in this interval, our diagnosis for F is less likely to be confused by symptoms for other faults.

Figure 2:
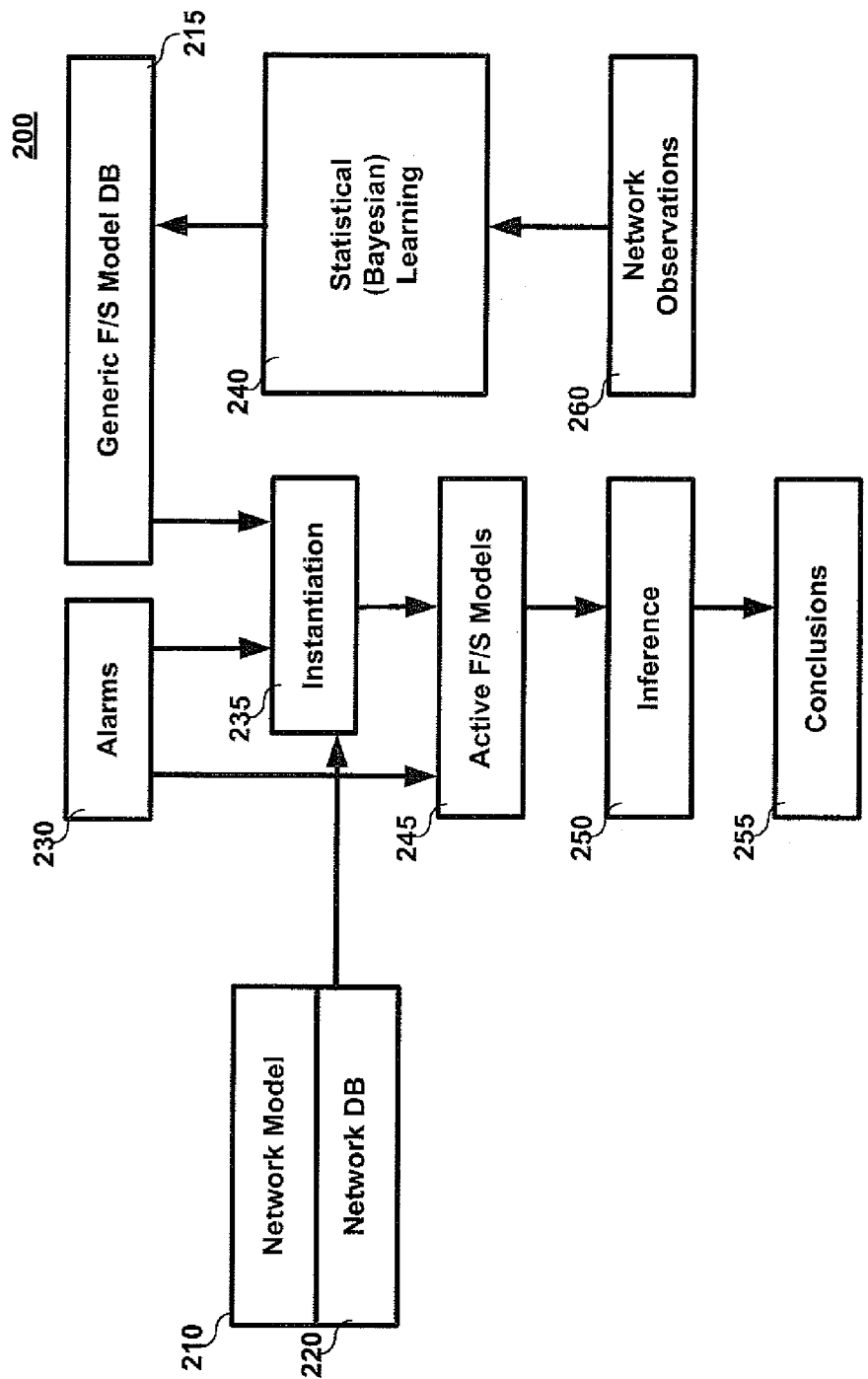
FIG. 2 is a schematic block diagram showing the overall processing of an exemplary fault diagnosis system according to an aspect of the present disclosure.

With reference now to FIG. 2, there is shown a block diagram of a system 200 which may be used to perform fault diagnosis according to an aspect of the present disclosure for a telecommunications network. As may be observed from that FIG. 2, any initial data employed by the system is contained within the Network Model 210, the Generic Fault/Symptom Model Data Base 215, and the Network Data Base 220.

The Network Model 210 is a schema that describes network elements and their (possible) relationships. The Network Data Base 220 is a description of any actual network under diagnosis—according to the schema of the Network Model 210. The Generic Fault/Symptom Model Data Base 215 is a description of possible faults and their consequences described in terms of the schema. As may be appreciated, it is preferable that this description be somewhat generic, describing—for each type of network element—the type(s) of possible faults with types of alarms that such faults can cause, the relationship(s) between faulty network elements and elements reporting the alarms, a window size for correlating alarms and any involved probabilities.

Of particular importance to the present disclosure, the probabilities include: a) the a priori probability that a fault will occur in any given time window, b) the probability that a particular alarm will occur in a given time window—if the fault occurs in the window, and c) the probability that a particular alai·m will occur in a given time window if the fault does not occur in the time window.

Alarms which enter the system are represented by the Alarms box, 230. Alarms are labeled by type of alarm, any network element(s)—such as reporting elements and/or suspect element(s), and finally a time of arrival for the particular alarm.

Instantiation box 235, represents an instantiation process by which the alarm and network data base containing a fault/symptom model 215 are compared to generate specific models of the faults that may be responsible for a given alarm. Included herein, are also any old, active specific models which may have been generated in response to previous alarms.

A set of active, specific fault/symptom models is maintained as represented by box 245. These specific fault/symptoms serve to track relevant symptoms observed in operation of the system under diagnosis.

Box 250 represents an inference process by which we determine the probability that a specific fault has occurred given any symptoms which have been observed. As may be readily appreciated, the inference process is a principal one of the present invention.

Conclusions generated as a result of the inferences, are represented by box 255. As may be appreciated, such a conclusion may be produced when—for example—an inference was that the fault did occur—including for example, the generation of a trouble ticket to generate some downstream maintenance activity.

Network observations—shown as box 260, represents a stream of confirmed observations that enter the overall system. Such confirmed observations provide information about—for example—time windows in which faults occurred and what alarms occurred. The statistical (Bayesian) learning is represented by box 240 and represents the process of updating probabilities contained within the generic fault/symptom data base 215 according to the network observations box 260.

In a preferred embodiment, a fault diagnosis system constructed according to the present disclosure requires one or more interface(s) to report any conclusions reached and set the repair process in motion. Such reporting can include the creation of "trouble tickets" and is performed by conclusion reporting system 255.

Operationally, upon the receipt of one or more alarms 230, inferences are generated 250, from which conclusions may be drawn 255. As a result of operating the network, observations are made 260, which are used to influence a statistical (Bayesian) learning model 240, which in turn is used to influence a generic fault/symptom model DB 215. As can be readily appreciated, such an operation may advantageously improve its ability to draw conclusions from inferences due to the feedback of network observations to the Bayesian network. Accordingly, the more the system runs, the more it learns about specific fault/symptom relationships and the better it becomes at reporting specific faults for particular symptoms.

At this point, it is useful to describe the probabilistic model employed in systems and methods according to the present disclosure. As shall be shown, a separate probabilistic model for each fault—along with its possible symptoms—is built. Those skilled in the art may perceive an apparent similarity to a common rule-based system wherein the main result of application of a rule is a decision about some single fault. In sharp contrast however, a method according to the present disclosure integrates both the rule-based and probabilistic methodologies into a common framework.

As noted previously—for many types of faults—symptoms that occur hours (or more) apart are much less likely to have been caused by the same fault than symptoms that occur only seconds apart. To account for these times, we advantageously adopt a relatively simple time window approach where at any one time we consider only those symptoms that have occurred within some predetermined length of time. For the probabilistic models employed herein, this means that we are concerned with the joint probabilities of faults and symptoms within a single time window.

For a basic model, we consider some particular fault F which spontaneously occurs at some rate r. In any chosen time window of length W, therefore, F occurs with probability $p(F,W) \approx rW$. For our purposes herein, we assume that rW is small enough such that the possibility that F occurs more than once in the same time window is negligible.

Fault F has observable consequences, such as alarms, which we conveniently call symptoms. For this model, we consider the symptom to be the actual observation of an alarm by the diagnosis system, not just the generation of the alarm, so the issue of lost symptoms does not require special notice in the model.

Let S be the set of symptoms that can result from F. It is not necessary that every symptom in S must occur every time F occurs. This could be because of loss of alarms in transit between reporting equipment and the diagnosis system. Accordingly, it is not the generation of an alarm, but rather the reception of an alarm by the diagnosis system that constitutes a symptom. Notably, symptoms may occur after some delay time period.

Let p(s,F,W) be the probability that we observe a symptom s in some time window of length W, given that a fault F occurs in that window. We allow for the possibility that a symptom is caused by some other fault. Let q(s,F,W) the probability that we observe a symptom s in some time window of length W, given that F does not occur in that window. To do an effective diagnosis, we should choose W large enough such that the symptoms caused by F are very likely to occur in the same window as F, if they occur at all.

Additionally, we allow for the possibility that p(s,F,W) is less than q(s,F,W). In this case symptom s is not really a consequence of fault F, and is indeed an indication that the fault is less likely to have happened. For example, if F is a fault which breaks a network into two or more disparate pieces—thereby separating the source of s from the diagnosis system—then the fact that we observe s suggests that F has not occurred.

If a set of symptoms, given the occurrence or non-occurrence of F, are independent of each other, the probability that, for a window of length W, F occurs and the set of symptoms O we observe is in that time window, is given by the following relationship:

$$b(F, O) = p(F, W) \prod_{s \in O} p(s, F, W) \prod_{s \notin O} (1 - p(s, F, W)) \quad (1)$$

The probability that F does not occur and the set of symptoms we observe is O is given by the following:

$$b(\overline{F}, O) = (1 - p(F, W)) \prod_{s \in O} q(s, F, W) \prod_{s \notin O} (1 - q(s, F, W)) \quad (2)$$

Notably, if a set of symptoms, given the occurrence or non-occurrence of F, are not independent of each other, the formulas given above for b(F,O) and b($\overline{F}$,O) will not be accurate. In this case it may be advantageous to identify disjoint sets of dependent symptoms, and treating each such set as a single symptom, to be reported if any one of the constituent symptoms occurs.

We may now describe two alternative diagnosis methods, differing in their treatment of time windows. In the first method, we use periodic time windows. After each interval of length W, we compile the set O of observed symptoms. For each possible root cause F of any of the observed symptoms, we compute b(F,O) and b($\overline{F}$,O). We then report F if b(F, O) is sufficiently larger than b($\overline{F}$,O). That is, if b(F,O)>αb($\overline{F}$,O) for some desired α.

In the second method, we use sliding time windows. Accordingly, we continuously monitor b(F,O) and b($\overline{FF}$,O) for the sliding time window of length W ending at the present, and report fault F whenever b(F,O) is sufficiently larger than b($\overline{F}$,O), that is, when b(F,O)>αb($\overline{F}$,O) for some desired α. As may be appreciated, these values will change both as new symptoms arrive, and as old symptoms pass out of the window.

Operationally, this is achieved by assigning weights to each possible relevant symptom—and a threshold value—and continuously comparing the sum of the weights of symptoms actually seen in the sliding window against the threshold. If the sum exceeds the threshold, we conclude that the fault has occurred. The scores and threshold values are assigned so that we make this conclusion when the probability that the fault has occurred in the interval, given the set of symptoms seen in the interval, exceeds a times the probability that the fault has not occurred in the interval, again given the symptoms seen.

In diagnosing faults, we note that while it be more convenient to use logarithms, there will be values of p( ) and q( ) that we must treat separately. Depending on how the values are generated, we may or may not be able to encounter them. In addition, we may define a number of general principles for fault diagnosis.

First, symptoms s for which p(s,F,W)=q(s,F,W) constitute no evidence one way or the other regarding F, and should be ignored. Second, symptoms s for which p(s,F,W)=1.0 are necessary consequences of F. These should be kept in a separate list so that, if they are not seen, F is not reported. Third, symptoms s for which $p(s,F,W)=0.0$ are absolute evidence that F has not occurred. These should be kept in a second list, so that, if they are seen, F is not reported. Fourth, symptoms s for which $q(s,F,W)=0.0$ are absolute evidence that F has occurred. These should be kept in a third list, so that, if they are seen, F is reported. It would be a rare model that had symptoms s for which $q(s,F,W)=1.0$. These could be kept on a fourth list, so that, if they are not seen, F is reported.

If we now let T be the set of symptoms in S that remain after these four exceptional cases, and U be the set of observed symptoms $O \cap T$ that remain. Then, whenever the rules given by these four lists do not apply, $b(F,O) > \alpha b(\bar{F},O)$ whenever $$\sum_{s \in U} \log\left(\frac{p(s, F, W)(1 - q(s, F, W))}{q(s, F, W)(1 - p(s, F, W))}\right) >$$

$$\log(\alpha) + \log\left(\frac{1 - p(F, W)}{p(F, W)}\right) + \sum_{s \in T} \log\left(\frac{1 - q(s, F, W)}{1 - p(s, F, W)}\right)$$

If we let $$a_s = \log\left(\frac{p(s, F, W)(1 - q(s, F, W))}{q(s, F, W)(1 - p(s, F, W))}\right),$$

$$c = \log(\alpha) + \log\left(\frac{1 - p(F, W)}{p(F, W)}\right), \text{ and}$$

$$d_s = \log\left(\frac{1 - q(s, F, W)}{1 - p(s, F, W)}\right)$$

we get $$\sum_{s \in U} a_s > c + \sum_{s \in T} d_s$$

These sums, then, are what we preferably maintain and compare to implement our probabilistic rule. We can think of the $a_s$ as weights applied to the symptoms.

Advantageously, if the network under examination contains multiple instances of a network object that exhibits a common pattern of symptoms resulting from faults, we can provide a common fault-symptom model from the following information.
1. The type of fault
2. Requirements for the possibly faulty object to fit this model, such as
   a. type of object, and
   b. attribute qualifications (e.g. model of equipment)
3. $p(F,W)$
4. W
5. A list of symptom information, for various classes of symptoms, including
   a. type of symptom
   b. attributes of symptomatic object
   c. relation of symptomatic object to faulty object
   d. $p(s,F,W)$
   e. $q(s,F,W)$ This provides information to the probabilistic fault inference module, for the purpose of generating relevant active instances. Preferably, an active instance includes:
1. The type of fault
2. The possibly faulty object
3. W
4. c
5. The four lists of possible symptoms with $p(s,F,W)$ or $q(s,F,W)$ values 0.0 or 1.0
6. The set T of remaining possible symptoms
7. For each symptom s in T, $a_s$ and $d_s$ 8. The resulting threshold $$c + \sum_{s \in T} d_s$$

9. The list of symptoms O seen in the last time window
10. A running total of $a_s$ over s in U.

Figure 3:
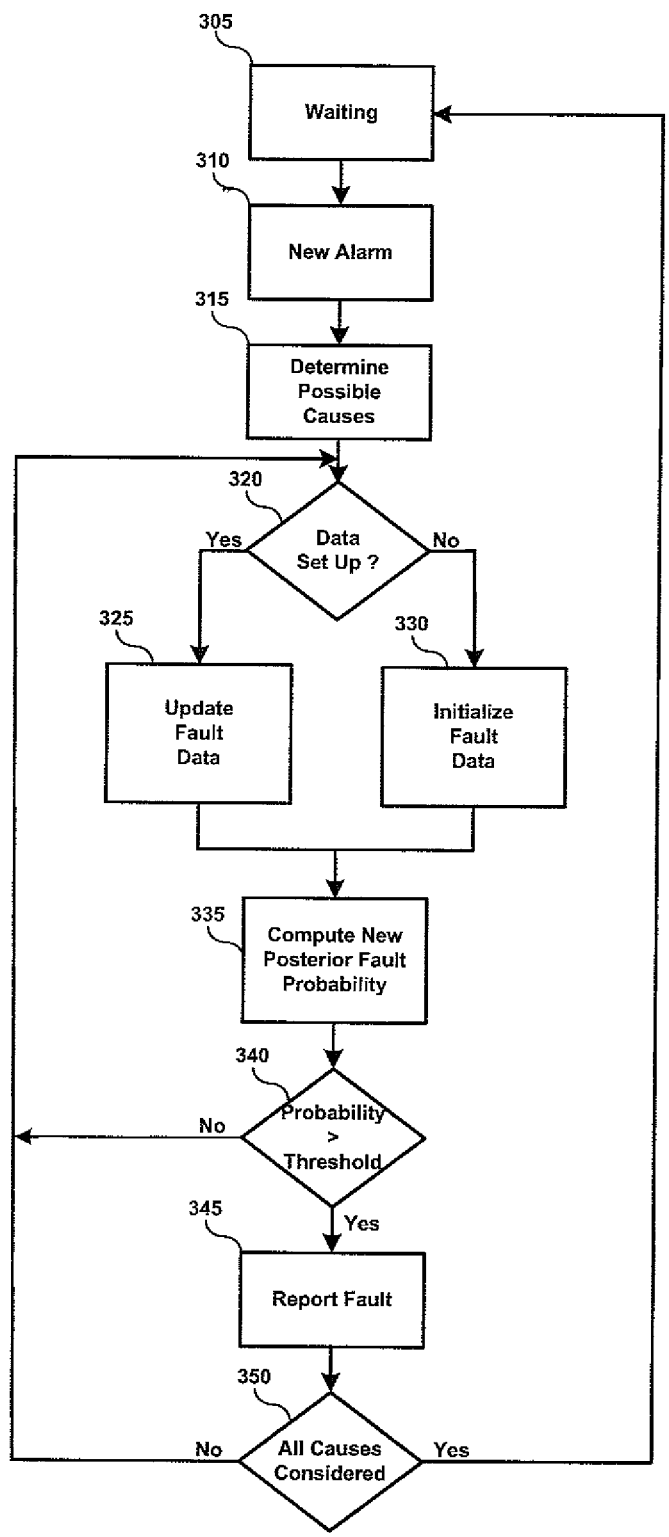
FIG. 3 is a simplified block flow diagram showing the steps involved in fault diagnosis according to an aspect of the present disclosure.

Accordingly, and with reference to FIG. 3, there is shown a flow-chart depicting the overall method according to an aspect of the present disclosure. As shown therein, a system is normally in a waiting state (block 305). If an alarm occurs (block 310) the system checks its models and databases to determine the possible causes (block 315). For a particular cause, the system checks whether data has been set up (block 320). If not, then fault data is initialized (block 330) for this fault. If the data has already been set up, the fault data is updated (block 325) to represent the appearance of the alarm.

In either case (block 330 or block 325) a new posterior fault probability (block 335) is computed in which the fault has occurred—given the alarms observed in the current time window using data maintained for this fault. Next, (block 340) a check is made whether this probability exceeds some user chosen probability. If yes, then the fault is reported (block 345) to—for example—a fault reporting/trouble ticketing facility. This overall process is continued for all possible causes for the fault (block 350) and when all possible causes have been examined, the system returns to the waiting state (block 305).

If symptoms leave the window, or if symptom clear messages arrive, we remove the symptoms from the list in item 9 (above) and from the running total in item 10 (above). It is not expected that these symptoms were caused by the same fault as any new symptoms that may arrive.

Figure 4:
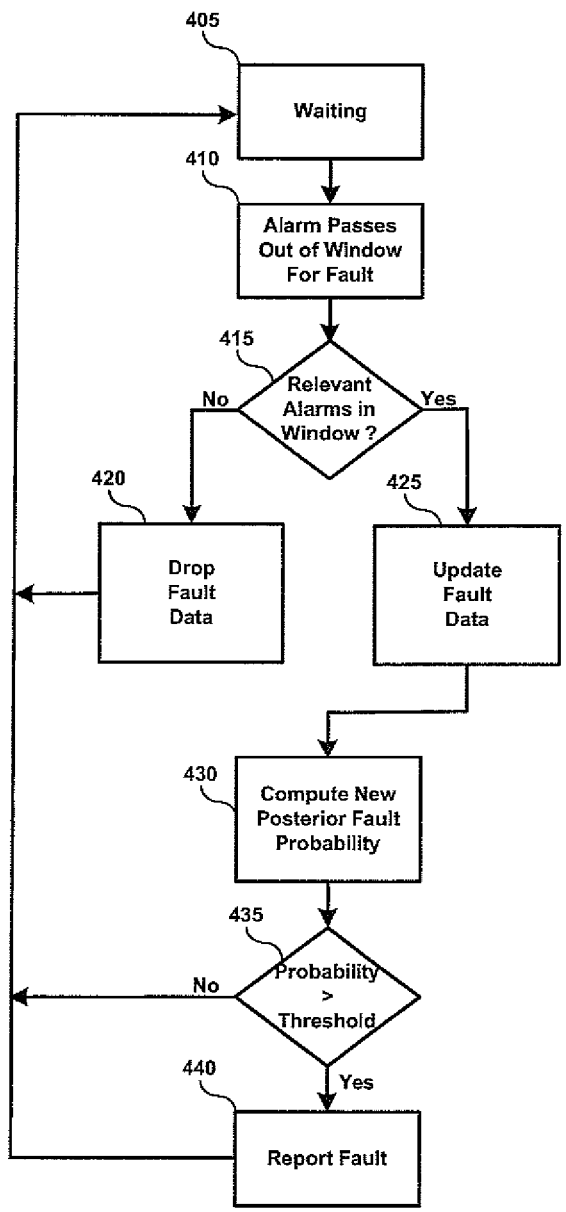
FIG. 4 is a simplified block flow diagram showing the steps involved in fault diagnosis according to an aspect of the present disclosure when an alarm ages out of a time window for one of its possible root causes.

FIG. 4 shows a simplified block flow diagram of the steps when an alarm ages out of the time window for one of its possible root causes. In a particular embodiment—the sliding time window version—this is due to the fact that the age of the alarm exceeds the window size for this root cause. In an alternative embodiment—the periodic time window version—this is because the current time window for this root cause has ended, and a new time window has begun.

Figure 4A:
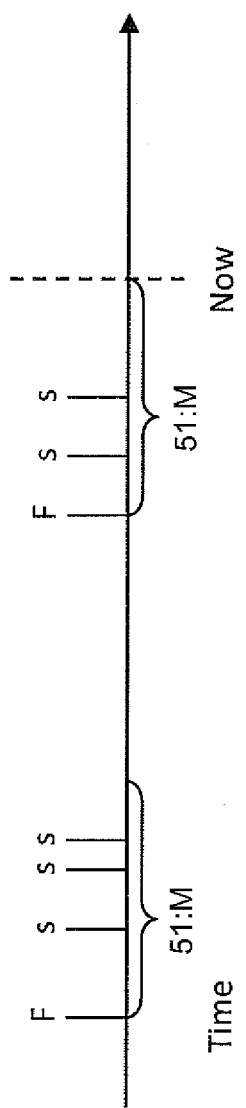
FIG. 4A is a simple drawing showing the process of time, faults, symptoms and time windows for a sliding window according to an aspect of the present disclosure.

FIG. 4A generally illustrates the process of time, faults, symptoms and time windows for the sliding time window version. As shown therein, two faults F are depicted. Along with each fault F are shown respective clusters of symptoms s. As depicted, symptoms occur after a delay of at most M after the occurrence of their root cause faults. Thus, at any instant of time, (such as "Now"), we consider only those symptoms that have appeared in window of length M which have most recently past. The symptoms in the earlier window were considered previously at the end of that earlier window. Accordingly, symptoms occurring in the earlier window are not considered when considering the symptoms and fault of the later window.

Figure 4B:
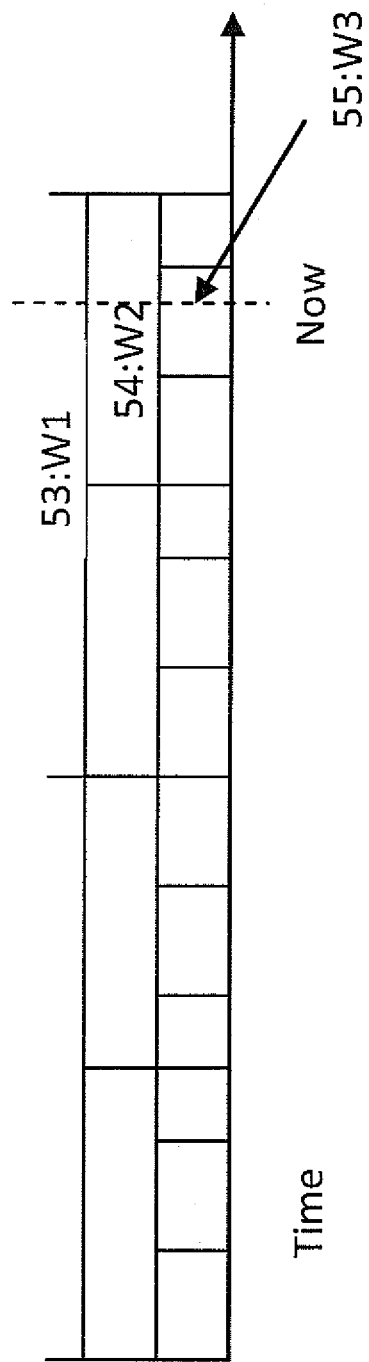
FIG. 4B is a simple drawing illustrating various window patterns for a periodic window according to an aspect of the present disclosure.

FIG. 4B generally illustrates the window pattern(s) for the periodic time window version. As shown therein, three different windows sizes are employed in this example that may be used for the diagnosis of different root cause faults. With reference to that FIG. 4B, it may be observed that at any given instant, we may be in time window W1 to diagnose a particular fault; time window W2 for the purpose of diagnosing another fault, and filially time window W3 for the purpose of diagnosing yet another fault.

With reference now to FIG. 4, we see that again we begin the process in the waiting state (block 405). Then, (block 410)

an alarm becomes too old for the time window for one of its possible root causes. In response, a check is performed (block 415) to determine whether the root cause has any relevant alarms still in its time window. If not then the root cause instance data is dropped (block 420) for the particular fault and return to the wait state (block 405). If alarms do still exist in the time window, then the root cause of the instance data are updated (block 425) and a new posterior probability is computed (block 430). In certain cases, this probability may increase so a check is made to compare the resulting probability with the threshold (block 435) and report the fault if that probability exceeded the threshold (block 440).

As may be appreciated, this procedure resembles the behavior of patterning rules, except that we allow for different symptoms to provide different amounts of evidence for the fault in question. That is, the weights $a_s$ can vary for different symptoms. Furthermore, the weights are based on a probabilistic model, and according to an aspect of the present disclosure are updated according to observations of the system.

Figure 5:
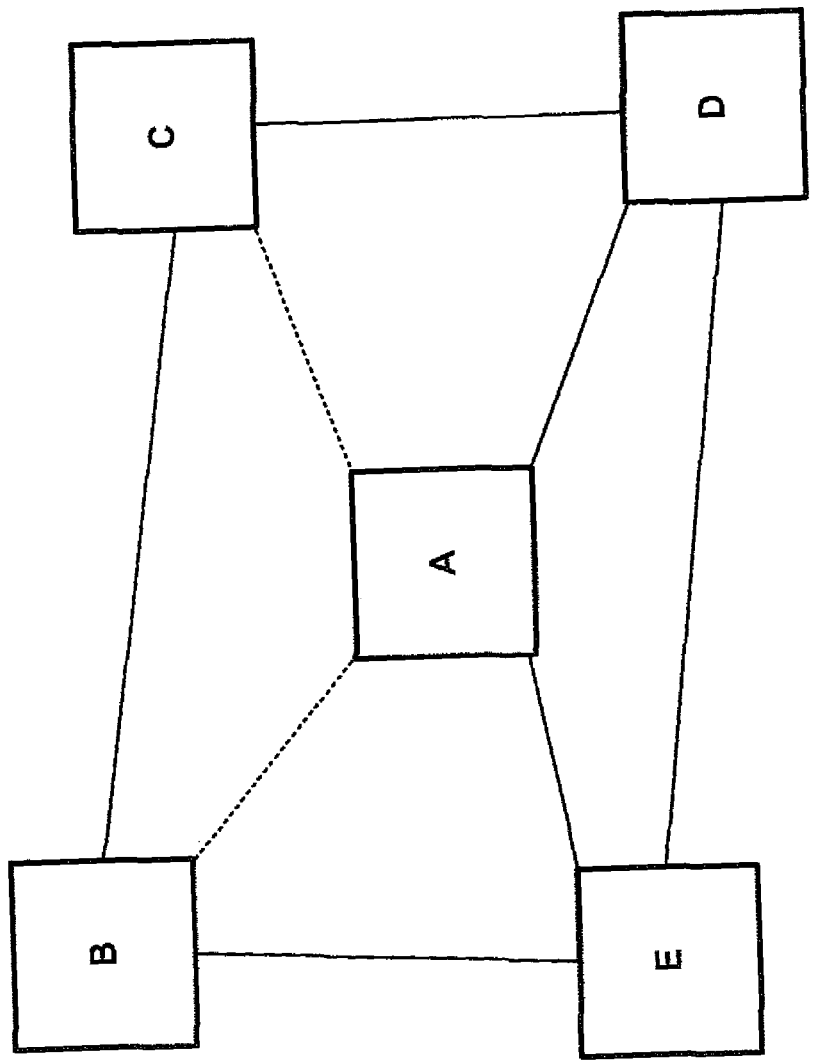
FIG. 5 is a simplified block flow diagram of an example network.

Turning now to FIG. 5, there is shown a schematic diagram of an exemplary network model which will serve as the focus of this discussion. As may be seen from this figure, the network comprises a number of nodes and links. Each node is connected to a variable number of links. Each link is either above ground or buried and is connected to two nodes.

The actual network is described by a database in terms of this model. We can use the following tables.

TABLE 1

Node information
Nodes

| NodeID | Connected Links |
|---|---|
| A | A-B |
|   | A-C |
|   | A-D |
|   | A-E |
| B | A-B |
|   | B-C |
|   | B-E |
| C | A-C |
|   | B-C |
|   | C-D |
| D | A-D |
|   | C-D |
|   | D-E |
| E | A-E |
|   | B-E |
|   | D-E |

TABLE 2

Link information
Links

| LinkID | Type | End Nodes |
|---|---|---|
| A-B | Above ground | A, B |
| A-C | Above ground | A, C |
| A-D | Buried | A, D |
| A-E | Buried | A, E |
| B-C | Buried | B, C |
| B-E | Buried | B, E |
| C-D | Buried | C, D |

TABLE 2-continued

Link information
Links

| LinkID | Type | End Nodes |
|---|---|---|
| D-E | Buried | D, E |

In the simple network example, there are two kinds of faults: node failures and link failures. There is however, only one kind of alarm: loss of signal on a link, reported by a node.

Suppose a node has an expected life of 1 year, a buried link has an expected life of 8 months, and an above-ground link has an expected life of 2 months. If a node fails, operators will receive a loss-of-signal alarm on its links from its direct neighbors, at a delay of 1 second, each with probability 0.999. If a link fails, operators will get a loss-of-signal alarm on the link from both of its endpoints, at a delay of 1 second, each with probability 0.999. If the time window is set to 5 minutes say, (about $10^{-5}$ year), the following information is available for a given node failure.

1. Node Failure
2. on all Node objects
3. $p(F, W) = 10^{-5}$
4. $W = 5$ minutes
5(i). Symptom list entry 1
   a. Loss of Signal
   b. on link, reported by an end-node of link, link is above ground
   c. link connected to faulty node, reporting node not equal to faulty node
   d. $p(s, F, W) = 0.9867$ (if fault occurs in last second of window, alarm won't appear until window is over)
   e. $q(s, F, W) = 6 \times 10^{-5}$ (this is the chance that the link has failed)
5(ii). Symptom list entry 2
   a. Loss of Signal
   b. on link, reported by an end-node of link, link is buried
   c. link connected to faulty node, reporting node not equal to faulty node
   d. $p(s, F, W) = 0.9867$ (if fault occurs in last second of window, alarm won't appear until window is over)
   e. $q(s, F, W) = 1.5 \times 10^{-5}$ (this is the chance that the link has failed)
5(iii). Symptom list entry 3
   a. Loss of Signal
   b. on link, reported by an end-node of link, link is above ground
   c. link connected to faulty node, reporting node is faulty node
   d. $p(s, F, W) = 3.5 \times 10^{-5}$ (this is the chance that another failure has caused the loss of signal just before the node failure)
   e. $q(s, F, W) = 7 \times 10^{-5}$ (this is the chance that another failure has caused the loss of signal during the window)
5(iv). Symptom list entry 4
   a. Loss of Signal
   b. on link, reported by an end-node of link, link is buried
   c. link connected to faulty node, reporting node is faulty node
   d. $p(s, F, W) = 1.25 \times 10^{-5}$ (this is the chance that another failure has caused the loss of signal just before the node failure)
   e. $q(s, F, W) = 2.5 \times 10^{-5}$ (this is the chance that another failure has caused the loss of signal during the window)

Advantageously, there are separate models for an aerial link failure and a buried link failure.

Now, suppose node "A" fails. As a result, loss-of-signal alarms will arrive from each of nodes "B", "C", "D", and "E", well within the 5 minute time window. Suppose the first alarm is from node "B". The system will query the Network DB and the Fault/Symptom model DB, and determine that possible causes are either node failure for node "A", or link failure on link A-B, and instantiate fault models for each case.

We will track the progress of the instance for node "A" failure. The instance will initially contain the information:

1. Node failure
2. of node A
3. W = 5 minutes
4. c = 11.5
5. No symptoms have p or q of 1.0 or 0.0
6. Relevant possible symptoms are {A-B loss of signal at B, A-B loss of signal at A, A-C loss of signal at C, A-C loss of signal at A, A-D loss of signal at D, A-D loss of signal at A, A-E loss of signal at E, A-E loss of signal at A}
7. $a_s$ are (14.0, −0.7, 14.0, −0.7, 15.4, −0.7, 15.4, −0.7), and $d_s$ are (4.3, 0, 4.3, 0, 4.3, 0, 4.3, 0)
8. The resulting threshold $c + \sum_{s \in T} d_s$ is 28.7
9. The list of symptoms O seen in the last time window is initially just {A-B loss of signal at B}
10. The running total of $a_s$ over s in U is initially 14.0

The threshold of 28.7 has not been reached.

Suppose that node "C" is next to report in. A model for link A-C failure will be instantiated, and the model for node "A" failure will have its running total updated to 28.0—still not enough evidence to determine the cause. When node "D" reports in, a model for link A-D failure will be instantiated, and the model for node "A" failure will have its running total updated to 42.0, which exceeds the threshold. At this point we conclude that it is more likely than not that node "A" has failed, and report this conclusion.

Note that if the first two links on which signal loss had been reported were not both the fragile above-ground links, we would have concluded node "A" failed before the third link status was reported. In this case, the loss-of-signal on the fragile links is weaker evidence than the loss-of-signal on the more robust links.

As may be appreciated, the attributes of the links reported on are important, not just their number. A traditional patterning rule only counts the number of contributing symptoms, and would either always declare the fault after two loss-of-signal alarms have been received, or always declare the fault after three loss-of-signal alarms have been received, but could not emulate the behavior of our probabilistic rule.

In setting up such a system, we may not have absolute confidence in our probability values (p(F,W), p(s,F,W), and q(s,F,W)). The uncertainty as to such probabilities is a common objection to use of probabilistic fault-diagnosis methods.

Accordingly our inventive disclosure operates on Bayesian principles. That is, we start with prior distributions for each of the probability values and update them as we observe network behavior in new time windows. Meanwhile, we use the mean values of the distributions in our fault diagnosis.

It would seem that determining the prior distribution of these parameters would more difficult than determining the parameters themselves. Fortunately, as data accumulates, the sensitivity to these initial distributions becomes small, so we choose distributions that are easy to update. One choice would be to assume that each of these parameters is uniformly distributed on the interval [0,1].

The uniform distribution over [0,1] is a special case of the beta distribution, which in general has density $$f(p) = \frac{\Gamma(\alpha+\beta)}{\Gamma(\alpha)\Gamma(\beta)} p^{\alpha-1}(1-p)^{\beta-1}, 0 < p < 1,$$

mean $$\frac{\alpha}{\alpha+\beta},$$

and variance $$\frac{\alpha\beta}{(\alpha+\beta)^2(\alpha+\beta+1)}.$$

The uniform distribution has parameters $\alpha=1$, $\beta=1$.

It is well known from statistical theory (see, for example [Hoel, Port, and Stone Introduction to Statistical Theory]), that if p is a random variable with a prior beta($\alpha,\beta$) distribution, and if $x_1, \ldots x_n$ is a sample of independent Bernoulli random variables each with $P(x_i=1)=p$, then the posterior distribution of p, given the values of $x_1, \ldots, x_n$ is beta($\alpha+N_S$, $\beta+N_F$), where $N_S$ is the number of i for which $x_i=1$, and $N_F$ is the number of i for which $x_i=0$.

If we have some knowledge of some probability p, we choose to model it as following some beta ($\alpha,\beta$) distribution, where $\alpha$ and $\beta$ are chosen so that the mean of the distribution represents our best prior estimate of the parameter. Such choices may be based—for example—on a laboratory study or previous field experience, and the variance represents our uncertainty of this estimate. We can then update $\alpha$ and $\beta$ as new observations occur, according to the above rule.

Let these distribution parameters for p(F,W) be $\alpha$(F,W) and $\beta$(F,W), the parameters for p(s,F,W), be $\alpha_p$(s,F,W) and $\beta_p$(s,F,W), and the parameters for g(s,F,W) be $\alpha_q$(s,F,W) and $\beta_q$(s,F,W).

As the system operates, it will identify disjoint time windows in which it has been determined whether fault F has occurred, and which symptoms have been seen. These time windows could, for example, be successive intervals. If it is not practical to determine this information for each such interval, such as if such determination is expensive, or requires specific personnel not always available, we can use a subset of these intervals. For a window in which F has occurred, it will add 1.0 to $\alpha$(F,W), and for each symptom s, it will add 1.0 to $\alpha_p$(s,F,W) if the symptom is seen, or to $\beta_p$(s,F,W) if the symptom is not seen. For a window in which F has not occurred, it will add 1.0 to $\beta$(F,W), and for each symptom s, it will add 1.0 to $\alpha_q$(s,F,W) if the symptom is seen, or to $\beta_q$(s,F,W) if the symptom is not seen.

For example, suppose we have a system with the possibility of one fault F, with two possible relevant symptoms $s_1$ and $s_2$. Through laboratory testing we have determined that the probability of F in a time window is about $10^{-9}$, but we have only ever observed one failure, so our estimate has variance of about $10^{-18}$. We haven't determined anything about the two symptoms. We therefore set our prior distribution parameters according to the second column of the following table 3.

TABLE 3

|  | initial value | after W1 | after W2 |
|---|---|---|---|
| $\alpha$(F, W) | 1 | 2 | 2 |
| $\beta$(F, W) | $10^9 - 1$ | $10^9 - 1$ | $10^9$ |
| p(F, W) | $10^{-9}$ | $2 \times 10^{-9}$ | $2 \times 10^{-9}$ |
| $\alpha_p(s_1, F, W)$ | 1 | 2 | 2 |
| $\beta_p(s_1, F, W)$ | 1 | 1 | 1 |
| p($s_1$, F, W) | 0.5 | 0.667 | 0.667 |
| $\alpha_q(s_1, F, W)$ | 1 | 1 | 1 |
| $\beta_q(s_1, F, W)$ | 1 | 1 | 2 |

TABLE 3-continued

|  | initial value | after W1 | after W2 |
|---|---|---|---|
| $q(s_1, F, W)$ | 0.5 | 0.5 | 0.333 |
| $\alpha_p(s_2, F, W)$ | 1 | 1 | 1 |
| $\beta_p(s_2, F, W)$ | 1 | 2 | 2 |
| P | 0.5 | 0.333 | 0.333 |
| $\alpha_q(s_2, F, W)$ | 1 | 1 | 2 |
| $\beta_q(s_2, F, W)$ | 1 | 1 | 1 |
| $q(s_2, F, W)$ | 0.5 | 0.5 | 0.667 |

Figure 6:
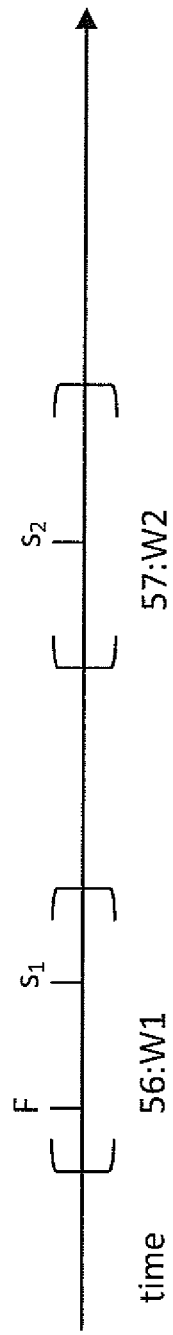
FIG. 6 is a simple drawing illustrating time windows for statistical learning according to an aspect of the present disclosure.
Figure 7:
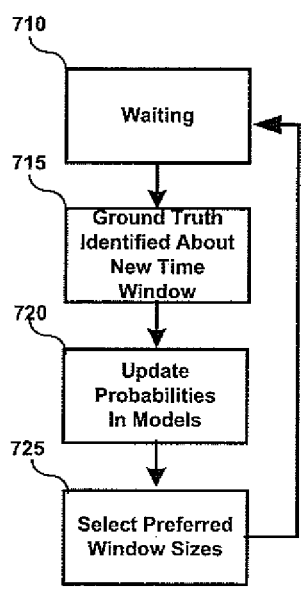
FIG. 7 is a simplified block flow diagram illustrating statistical learning processes according to an aspect of the present disclosure.

We may better understand our statistical learning with simultaneous reference to FIG. 6 and FIG. 7 which schematically represent our statistical learning of the probabilities of the models. As shown, we begin by operating in a waiting state 710. At some time, outside processes have identified time windows in which we know both what alarms were received and what faults actually occurred (Ground Truth Identified) 715. For example, as shown in FIG. 6, W1 is a window in which fault F and symptom s1 occurred and W2 is a window in which only symptom s2 occurs. As may be appreciated, even though no fault occurs in W2, there is nevertheless a symptom s2 which did. Similarly, there could have been windows which had faults but no symptoms. We use this data to adjust the probabilities given in the fault/symptom models 720. Optionally, we may compare statistical powers of resulting tests and select any window sizes that produce the most desirable tests 725.

Now, in operation, we observe time windows W1 and W2, as in FIG. 6, and update our distribution parameters. In time window W1, fault F and symptom $s_1$ occur, but not symptom $s_2$. We update the distribution parameters shown in the third column of the table 3. In time window W2, symptom $s_2$ occurs, but not fault F or symptom $s_1$. We further update the distribution parameters to those shown in the fourth column of the table 3.

For this purpose of refining our probabilities, the determination of when F has occurred should involve actual inspection of the network, and not depend solely on the results of this probabilistic fault diagnosis system. Furthermore, to avoid bias, the choice of time windows used should be independent of what occurs within them.

Figure 8:
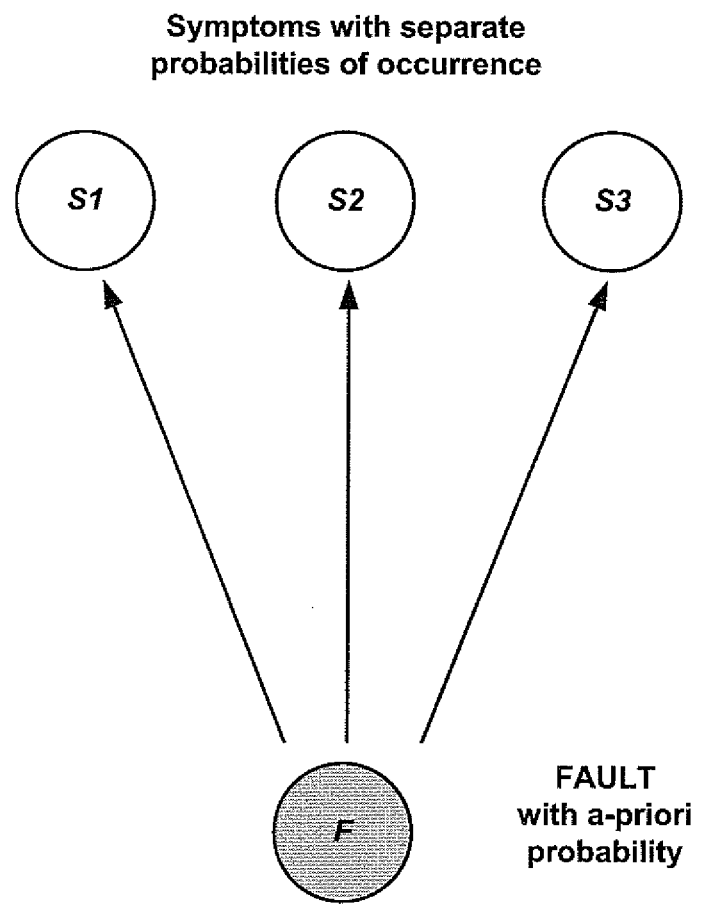
FIG. 8 is a simplified block diagram illustrating the relationship(s) between a given fault F and a set of symptoms each exhibiting a separate probability of occurrence.

Importantly, the choice of window size will have an effect on the quality of the diagnosis system. As we have noted previously, a particular fault F exhibits an a-priori probability and that fault F may produce one or more symptoms S1, S3, or 53 each individually exhibiting a separate probability of occurrence (See FIG. 8). We want a window size large enough to include, with high probability, all or almost all of the symptoms resulting from a fault. On the other hand, the larger the window is, the more likely that we include symptoms caused by multiple faults. Furthermore, if our diagnosis uses periodic windows rather than sliding windows, a large window means a large delay in diagnosing a fault. Advantageously, we may assign a different window size for the diagnosis of each possible fault.

To address these issues we describe a preferred method for setting the window sizes. We consider a set of options for window sizes, such as M, 2M, 4M, 8M, . . . . It is not necessary that each window size be an integer multiple of the previous size, but this may make implementation easier. The largest window size considered should be no more than the allowable diagnosis delay. If we have any data on delay between faults and symptoms, we should set the smallest size option to be large enough that there is a reasonable probability that a fault and most of its symptoms appear in the same window. In present embodiments, we maintain separate values for our probability estimates p(F,W), p(s,F,W), and q(s,F,W) for each different option for window size W.

At periodic intervals, we compare the behavior of diagnosis using these window sizes, and choose the best ones, according to estimates we will make of their error rates. For each window size W, we estimate both $e_1$, the rate of type I error, that of diagnosing a fault when it has not occurred, and $e_2$, the rate of type II error, that of failing to diagnose a fault that has occurred. We must set costs $g_1$ and $g_2$ for these two types of error, representing our preferences in the trade-off between them. We choose the window size that has the least value of $g_1 e_1 + g_2 e_2$, among our options.

Preferably, we choose a single window size for each type of fault. Since these error rates may vary between instances of a fault at different network elements, because of different connections with other network elements, we must pick a representative fault instance for this choice.

We describe two alternative methods for calculating these error rates, both assuming that diagnosis is done with periodic windows rather than sliding windows. If the number of possible symptoms of the fault under consideration is sufficiently small, we use the formulas in equations 1 and 2 for each possible subset O of relevant symptoms the probabilities b(F, O) that both the fault and the subset of symptoms have occurred in the window, and the probabilities b($\bar{F}$,O) that the subset of symptoms has occurred in the window, but the fault has not occurred in the window. For example, let $$E_1 = \{O : b(F,O) > \alpha b(\bar{F},O)\}$$

$$E_2 = \{O : b(F,O) \leq \alpha b(\bar{F},O)\}$$

be the sets of observation subsets that according to our rule lead respectively (1) to a diagnosis of fault F, and (2) to a diagnosis of not F, and then $$e_1 = \frac{1}{W} \sum_{O \in E_1} b(\bar{F}, O)$$

$$e_2 = \frac{1}{W} \sum_{O \in E_2} b(F, O)$$

are the rates we require.

If the number of relevant symptoms is too large for this enumeration to be practical, we may use Monte Carlo methods, taking a random sample according to our distribution information given in the p(F,W), p(s,F,W), and q(s,F,W). A number of techniques can be used to avoid the problem in which the overwhelmingly most likely event is that a window has neither a fault nor any symptoms. For example, we can use simulation to estimate the probability of failing to detect fault F, given that it occurs in the window, and use separate simulations to estimate the probabilities of falsely detecting fault F, given that neither fault F nor symptoms $S_1$ through $S_k$ appear, but $S_{k+1}$ does appear. From these we can compute the error rates.

Figure 9:
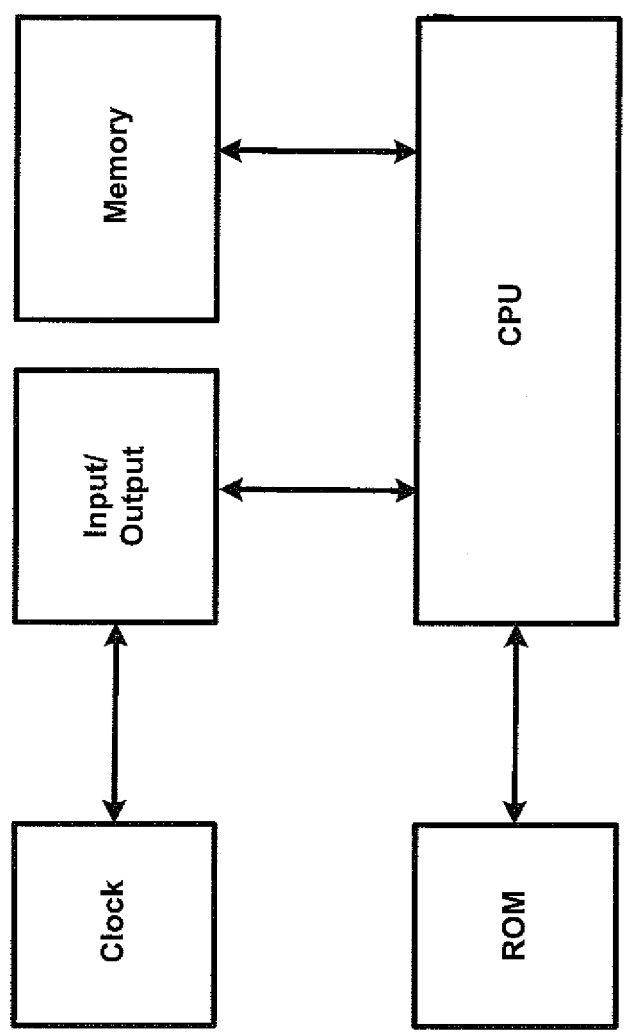
FIG. 9 is a simplified block diagram of an exemplary computer system upon/within which the present invention may be implemented and operated.

At this point, while we have discussed and described the invention using some specific examples, those skilled in the art will recognize that our teachings are not so limited. More particularly, our inventive teachings when implemented on a computer such as that shown in FIG. 9, any of a number of useful applications for our invention arise. Accordingly, the invention should be only limited by the scope of the claims attached hereto.

What is claimed is:

1. A computer implemented method for fault diagnosis of a system which exhibits one or more symptoms, the method comprising the steps of:
   maintaining for each root-cause fault an a-priori probability that the fault will appear in a time window of specified length;
   maintaining for each possible symptom of the fault, a probability that the symptom will appear in a time window containing the fault and a probability that the symptom will not appear in a time window containing the fault; and
   upon detecting one or more symptoms, determining the fault(s) that produced the symptom(s), and
   providing an indication of the fault(s).

2. The computer implemented method of claim 1 further comprising the steps of:
   updating the probabilities to reflect past time windows for which a determination of faults and their actual symptom(s) have been made.

3. The computer implemented method of claim 2 further comprising the steps of:
   assigning to each root cause fault one or more time windows of various lengths.

4. The computer implemented method of claim 1 wherein said fault determination further comprises the steps of:
   assigning a weight to each of a possible set of symptoms; and
   comparing the sum of the weights to all of the symptoms appearing in the time window to a pre-determined threshold value.

5. The computer implemented method of claim 1 wherein said fault determination is made upon ascertaining that the probability of the fault occurring in the time window, given a set of symptoms appearing in the time window exceeds a multiple of a probability that the fault has not occurred in the time window given the set of symptoms which appeared.

6. The computer implemented method of claim 2 further comprising the steps of:
   for a time window in which a particular fault has occurred
      adjusting a probability distribution measure of that fault occurring to reflect the occurrence of the fault;
      adjusting a probability distribution measure for each symptom appearing in that window; and
      adjusting a probability distribution measure for each symptom not appearing in that window;
   for a time window in which the particular fault has not occurred
      adjusting a probability distribution measure of that fault not occurring to reflect the non-occurrence of the fault;
      adjusting a probability distribution measure for each symptom appearing in that window; and
      adjusting a probability distribution measure for each symptom not appearing in that window.

7. The computer implemented method of claim 1 further comprising the steps of:
   setting a size for the time window to be no more than an allowable diagnosis delay.

8. The computer implemented method of claim 1 further comprising the steps of:
   setting a size for the time window such that for a given fault a majority of its associated symptoms will appear in the same time window.

9. The computer implemented method of claim 1 further comprising the steps of:
   determining for a particular window size an estimate of diagnosing a fault when it has not occurred (e1) and an estimate of failing to diagnose a fault that has occurred (e2).

10. The computer implemented method of claim 9 further comprising the steps of:
    associating a cost with (e1) and (e2) and choosing a window size that is least cost.

* * * * *

UNITED STATES PATENT AND TRADEMARK OFFICE
CERTIFICATE OF CORRECTION

PATENT NO.         : 8,694,836 B2
APPLICATION NO.    : 12/694651
DATED              : April 8, 2014
INVENTOR(S)        : Lapiotis et al.

Page 1 of 1

It is certified that error appears in the above-identified patent and that said Letters Patent is hereby corrected as shown below:

Title Page, Item (56), under "OTHER PUBLICATIONS", in Column 2, Line 1, delete ""Probabalistic" and insert -- "Probabilistic --, therefor.

In the Specification

In Column 4, Line 25, delete "alai in" and insert -- alarm --, therefor.

In Column 6, Line 40, delete " $b(FF,O)$ " and insert -- $b(F,O)$ --, therefor.

In Column 8, Line 64, delete "filially" and insert -- finally --, therefor.

In Column 12, Line 17, delete "$x_1, \ldots x_n$" and insert -- $x_1, \ldots, x_n$ --, therefor.

In Column 12, Line 32, delete "g(s,F,W)" and insert -- q(s,F,W) --, therefor.

In Column 13, Line 47, delete "S1, S3," and insert -- S1, S2, --, therefor.

In Column 13, Line 48, delete "or 53" and insert -- or S3 --, therefor.

Signed and Sealed this
Fourteenth Day of April, 2015

Michelle K. Lee
*Director of the United States Patent and Trademark Office*